United States Patent Office 2,812,756
Patented Nov. 12, 1957

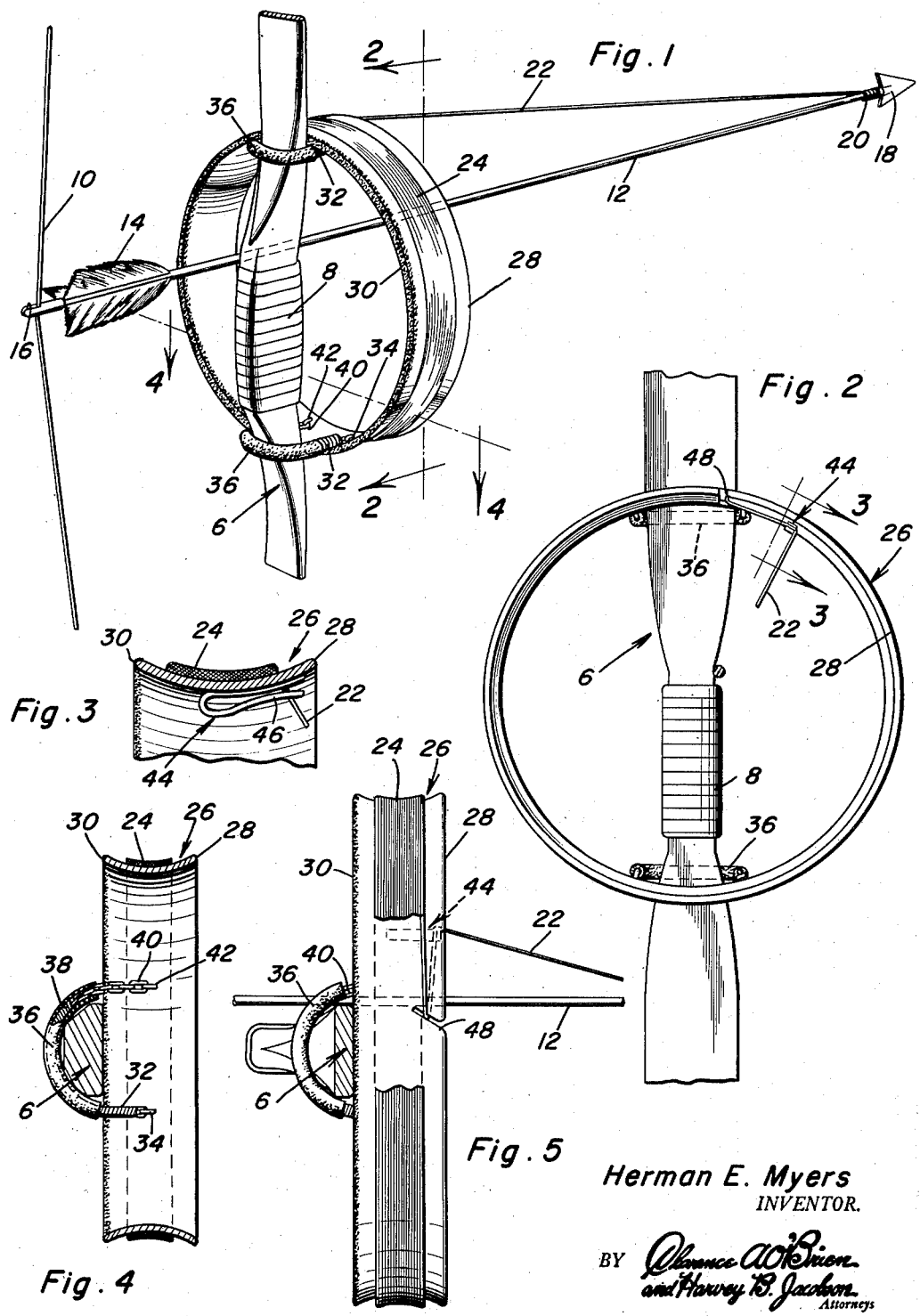
Herman E. Myers
INVENTOR.

2,812,756

BOW AND ARROW FISHING DEVICE

Herman E. Myers, Minneapolis, Minn., assignor of one-half to Crystal Myers, Milwaukee, Wis.

Application July 9, 1956, Serial No. 596,477

2 Claims. (Cl. 124—23)

The present invention relates to a novel fishing device characterized by a conventional bow, a suitably constructed arrow, a special reel mounted on the bow and a fishing line connected with the reel at one end and having its opposite end connected with the arrow.

The object of the invention is to provide one, an archer for example, with added equipment whereby he may, aided by his archery talents and skill, become an efficient angler.

More specifically, the invention pertains to the provision of a readily applicable and removable spinning-type reel which is susceptible of being effectually and reliably mounted on the hand-grip portion of the bow and which provides an ideal and simple reel for the fishing line, one which is appropriate to maintain the fish spearing arrow captive but does not interfere with the accurate flight thereof.

Other objects, features and advantages will become more readily apparent from the following description and the accompanying sheet of drawings.

In the drawings:

Fig. 1 is a perspective view of a fragmentary portion of the bow and showing the full arrow plus the improved spinning-type reel and illustrating the construction as it appears when in use;

Fig. 2 is a section on an enlarged scale taken on the vertical line 2—2 of Fig. 1;

Fig. 3 is a section on the line 3—3 of Fig. 2;

Fig. 4 is a horizontal section on the line 4—4 of Fig. 1; and

Fig. 5 is a fragmentary plan view of the structure depicted in Fig. 1.

Referring now to the drawings the bow and arrow are substantially conventional in construction or form. The handle of the bow is denoted at 6 and the hand-grip at 8 and the bow-string at 10. The arrow comprises a shaft 12 with the usual guide feathers or vanes 14 and with the customary bifurcated or notched end 16 with which the string is connected in a well known manner. The arrowhead may vary in construction and is here denoted generally by the numeral 18. The end portion 20 of the part 22 of the fishing line 24 is connected in any appropriate manner with the shaft of the arrow just behind the arrowhead so that the line will be carried out when the arrow is shot in the usual fashion.

The other end of the fishing line is, of course, attached to the reel so that it may be wound thereon. The reel is denoted generally by the numeral 26 and comprises an endless metal or equivalent lightweight ring which is substantially channel-shaped in cross-section. The intermediate channel portion is denoted at 28 and the wrappings of the fishing line are wound thereon as shown in the drawings. The forward marginal edge of the ring or reel is denoted at 28 and the rear edge at 30. The attaching devices for the reel are simple mechanical expedients which are readily applicable and removable.

These devices may be called flexible attaching elements and they are diametrically opposite one another and attached to and carried by the ring-like reel. A description of one will suffice for both and referring to Fig. 4 it will be seen that a coil spring 32 has one end permanently anchored at 34 on the inner periphery of the reel and this extends through a rubber or equivalent sleeve or covering 36 where one end portion 38 is connected with a chain 40. The links of the chain are selectively connectible with a keeper hook 42 also fixedly mounted on the interior of the reel in the manner shown. Thus, these devices are wrapped around the bow and secured in place in the manner shown thus positioning the reel at about the central portion of the bow as clearly illustrated in the drawings. This permits one to catch hold of the hand-grip on the bow in the usual way and to shoot the bow in a customary fashion without interference from the reel. When the arrow is propelled it picks up and carries the fishing line out with it in an obvious manner and if the arrow finds its mark the fish is thus speared, much as would be the case in any other similar hunting expedition.

It will be clear that the cross-sectional construction of the reel is such that the line windings unwrap themselves and permit the line to be payed out rapidly as is obviously called for once the arrow is released and shot.

The numeral 44 designates a spring clip the finger of which is denoted at 46 and adjacent to which a keeper notch 48 is provided to hold the line until the arrow is intentionally shot.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a fishing device comprising a bow having a hand-grip intermediate the ends of said bow, a captive-type arrow embodying a shaft having an arrowhead on its leading end constructed to pierce and embed itself in a victim fish, a fishing line having one end attached to the shaft inwardly of the arrowhead on the shaft, and a reel, the cooperating end of said line being wound on said reel, said reel comprising an endless ring having diametrically opposite portions of its rearward edge directly abutting and detachably but operatively connected with the cooperating intermediate portion of said bow, said ring being channel-shaped in cross-section, of a diameter appreciably greater than the cross-section of said bow and having substantial left and right portions thereof projecting well beyond the corresponding lengthwise sides of the bow, and said ring being such in diameter that the diametrically opposite portions which bear against the bow do so at places on the bow beyond the effective length of said intermediate portion of the bow.

2. In combination, a fishing device comprising a convention-type bow having a hand-grip intermediate the ends of said bow, a spinner-type reel comprising an endless ring channel-shaped in cross-section and unobstructively open at the forward and rearward sides, said hand-grip being located within the confines of said ring and the portions of the bow above and below the hand-grip abutting diametrically opposite upper and lower portions of the rearward edge of said ring, means carried by the inner peripheral surface of said ring and releasably embracing the cooperating portions of the bow clearly above and below the usable portion of the hand-grip and thus mounting the ring on the bow, said ring being of a diameter appreciably greater than the cross-section of said hand-grip and bow and having its respective right-hand and left-hand half-portions projecting laterally beyond the corresponding lengthwise side surfaces of the cooperating portions of the bow, an arrow adapted to be aimed and shot completely through the opening defined by said ring, the diameter of the opening in said ring being amply large and such that it does not interfere with holding and shooting the arrow through said opening, a fishing line having one end attached to the shaft of the arrow inwardly of the head on the leading end of the shaft, said fishing line being adapted to be wound on said reel, and means on said reel for connecting a portion of the line to the reel whereby the major portion of the line may be wound and stored on the reel in readiness for use.

References Cited in the file of this patent

UNITED STATES PATENTS

| | | |
|---|---|---|
| 736,051 | Adams | Aug. 11, 1903 |
| 1,133,189 | Shannon | Mar. 23, 1915 |
| 1,457,983 | Malone | June 5, 1923 |
| 1,746,246 | Elworthy | Feb. 11, 1930 |
| 1,796,093 | Florman | Mar. 10, 1931 |
| 1,836,878 | Sauer | Dec. 15, 1931 |
| 2,241,695 | Barton | May 31, 1941 |
| 2,504,525 | Holderness | Apr. 18, 1950 |
| 2,731,756 | Nelson | Jan. 24, 1956 |